US011936904B2

United States Patent
Liu et al.

(10) Patent No.: US 11,936,904 B2
(45) Date of Patent: Mar. 19, 2024

(54) METHODS OF VIDEO ENCODING AND/OR DECODING WITH BIDIRECTIONAL OPTICAL FLOW SIMPLIFICATION ON SHIFT OPERATIONS AND RELATED APPARATUS

(71) Applicant: Telefonaktiebolaget LM Ericsson (publ), Stockholm (SE)

(72) Inventors: Du Liu, Solna (SE); Ruoyang Yu, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 17/641,646

(22) PCT Filed: Sep. 17, 2020

(86) PCT No.: PCT/SE2020/050868
§ 371 (c)(1),
(2) Date: Mar. 9, 2022

(87) PCT Pub. No.: WO2021/054886
PCT Pub. Date: Mar. 25, 2021

(65) Prior Publication Data
US 2022/0377371 A1    Nov. 24, 2022

Related U.S. Application Data

(60) Provisional application No. 62/903,090, filed on Sep. 20, 2019.

(51) Int. Cl.
H04N 19/577    (2014.01)
H04N 19/109    (2014.01)
(Continued)

(52) U.S. Cl.
CPC ......... *H04N 19/577* (2014.11); *H04N 19/109* (2014.11); *H04N 19/132* (2014.11);
(Continued)

(58) Field of Classification Search
CPC ............... H04N 19/109; H04N 19/132; H04N 19/136; H04N 19/176; H04N 19/186;
(Continued)

(56) References Cited

U.S. PATENT DOCUMENTS

2018/0192072 A1    7/2018    Chen et al.
2018/0262773 A1    9/2018    Chuang et al.
(Continued)

FOREIGN PATENT DOCUMENTS

EP    3471417 A1    4/2019
WO    2018166357 A1    9/2018
(Continued)

OTHER PUBLICATIONS

Extended European Search Report dated Oct. 11, 2022 for European Patent Application No. 20865856.7, 12 pages.
(Continued)

*Primary Examiner* — Kathleen M Walsh
(74) *Attorney, Agent, or Firm* — Sage Patent Group

(57) ABSTRACT

A method of performing bi-directional optical flow, BDOF, processing for a video sequence of images, with each image including a plurality of blocks with bidirectional-predicted inter coding blocks, BPICBs. The method includes obtaining a shifted pair of refinement parameters per a subblock of a bidirectional-predicted inter coding block, wherein the shifted pair of refinement parameters includes a shifted first refinement parameter and a shifted second refinement parameter. The method includes determining a BDOF offset without performing any right shifting using at least the shifted pair of refinement parameters by, for each sample in
(Continued)

each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

24 Claims, 5 Drawing Sheets

(51) Int. Cl.
H04N 19/132 (2014.01)
H04N 19/136 (2014.01)
H04N 19/176 (2014.01)
H04N 19/186 (2014.01)
H04N 19/52 (2014.01)

(52) U.S. Cl.
CPC ......... *H04N 19/136* (2014.11); *H04N 19/176* (2014.11); *H04N 19/186* (2014.11); *H04N 19/52* (2014.11)

(58) Field of Classification Search
CPC ...... H04N 19/43; H04N 19/513; H04N 19/52; H04N 19/54; H04N 19/577; H04N 19/70
USPC ................................... 375/240.16
See application file for complete search history.

(56) References Cited

U.S. PATENT DOCUMENTS

| | | | |
|---|---|---|---|
| 2018/0376166 A1 | 12/2018 | Chuang et al. | |
| 2020/0366889 A1 | 11/2020 | Huang et al. | |
| 2022/0337842 A1* | 10/2022 | Park .................... | H04N 19/137 |

FOREIGN PATENT DOCUMENTS

| | | |
|---|---|---|
| WO | 2018169989 A1 | 9/2018 |
| WO | 2018199468 A1 | 11/2018 |
| WO | 2019010156 A1 | 1/2019 |
| WO | 2020061082 A1 | 3/2020 |
| WO | 2020181997 A1 | 9/2020 |
| WO | 2020200159 A1 | 10/2020 |
| WO | 2020211864 A1 | 10/2020 |
| WO | 2020223552 A1 | 11/2020 |

OTHER PUBLICATIONS

Kiaoyu Xiu et al.; CE9-Related: A Simplified Design of Bi-Directional Optical Flow (BIO); Joint Video Experts Team (JVET) of ITU-T SG 16 WP 3 and ISO/IEC JTC 1/SC 29/WG 11; Document No. JVET-L0591; 12th Meeting; Macao, China; Oct. 3-12, 2018; 9 pages.

Han Huang et al.; CE4-Related: Simplification of PROF and BDOF; Joint Video Experts Team (JVET) of ITU-T SG 16 WP 3 and ISO/IEC JTC 1/SC 29/WG 11; Document No. JVET-P0091; 16th Meeting; Geneva, Switzerland; Oct. 1-11, 2019; 3 pages.

Examination Report dated Aug. 25, 2022 for Indian Patent Application No. 202247022945, 6 pages.

International Search Report and Written Opinion of the International Searching Authority for PCT International Application No. PCT/SE2020/050868 dated Dec. 2, 2020.

Liu et al., "Non-CE4: Simplification on BDOF offset calculation," Document: JVET-P0201-v2, Joint Video Experts Team (JVET) of ITU-T SG 16 WP 3 and ISO/IEC JTC 1/SC 29/WG 11, 16th Meeting: Geneva, CH, Oct. 1-11, 2019, 5 pages.

Liu et al., "Non-CE4: Modifications on BDOF intermediate parameter derivation," Document: JVET-P0200-v2, Joint Video Experts Team (JVET) of ITU-T SG 16 WP 3 and ISO/IEC JTC 1/SC 29/WG 11, 16th Meeting: Geneva, CH, Oct. 1-11, 2019, 7 pages.

Alexander et al., "Bi-directional optical flow for future video codec," 2016 Data Compression Conference (DCC), IEEE, Mar. 30, 2016, pp. 83-90.

Yu et al., "Non-CE9: On motion refinement parameter derivation in BDOF," Document: JVET-N0152, Joint Video Experts Team (JVET) of ITU-T SG 16 WP 3 and ISO/IEC JTC 1/SC 29/WG 11, 14th Meeting: Geneva, CH, Mar. 19-27, 2019,5 pages.

Sethuraman, "Non-CE9: Refinement of optical flow estimates in BDOF, " Document: JVET-O0508-v1, Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

Bross et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.

* cited by examiner

| | RANDOM ACCESS | | |
|---|---|---|---|
| | OVER VTM-6.0 | | |
| | Y | U | V |
| Class A1 | 0.00% | -0.03% | 0.05% |
| Class A2 | 0.01% | 0.01% | 0.05% |
| Class B | -0.02% | -0.01% | 0.02% |
| Class C | 0.01% | 0.06% | 0.00% |
| Class E | | | |
| Overall | 0.00% | 0.01% | 0.03% |
| Class D | -0.01% | -0.12% | -0.01% |
| Class F | 0.01% | 0.01% | 0.01% | ent
METHODS OF VIDEO ENCODING AND/OR DECODING WITH BIDIRECTIONAL OPTICAL FLOW SIMPLIFICATION ON SHIFT OPERATIONS AND RELATED APPARATUS

CROSS REFERENCE TO RELATED APPLICATIONS

This application is a 35 U.S.C. § 371 national stage application of PCT International Application No. PCT/SE2020/050868 filed on Sep. 17, 2020, which claims the benefit of U.S. Provisional Patent Application Ser. No. 62/903,090, filed on Sep. 20, 2019, the disclosures and content of which are incorporated by reference herein in their entireties.

TECHNICAL FIELD

The present disclosure relates generally to video processing, and more particularly, to video encoding and/or decoding and related methods and devices.

BACKGROUND

A video sequence contains a sequence of pictures. A common color space used in video sequences is YCbCr, where Y is the luma (brightness) component and Cb and Cr are the chroma components. The pictures are placed in display order. Each picture is assigned with a Picture Order Count (POC) value to indicate its display order.

Video coding is used to compress the video sequences into a sequence of coded pictures. Usually, a picture is divided into blocks with sizes ranging from 4×4 to 128×128. A block is a two-dimensional array of samples. The blocks serve as the basis for coding. A video decoder then decodes the coded pictures into pictures containing sample values.

The Moving Picture Experts Group (MPEG) and the ITU Telecommunication Standardization Sector (ITU-T) are working on a new video coding standard referred to as Versatile Video Coding (VVC). Presently, the current version of the VVC draft specification is B. Bross, J. Chen, S. Liu, "Versatile Video Coding (Draft 6)", Output document approved by JVET, document number JVET-02001 (also referred to herein as "VVC Specification Draft 6").

The VVC Specification Draft 6 video coding standard uses a block structure referred to as quadtree plus binary tree plus ternary tree block structure (QTBT+TT) where each picture is first partitioned into square blocks called coding tree units (CTU). The size of all CTUs are identical and the partition is done without any syntax controlling it. Each CTU is further partitioned into coding units (CU) that can have either square or rectangular shapes. The CTU is first partitioned by a quad tree structure, then it may be further partitioned with equally sized partitions either vertically or horizontally in a binary structure to form coding units (CUs). A block could thus have either a square or rectangular shape. The depth of the quad tree and binary tree can be set by the encoder in the bitstream. An example of dividing a CTU using QTBT is illustrated in FIG. 1. The ternary tree (TT) part adds the possibility to divide a CU into three partitions instead of two equally sized partitions; this increases the possibilities to use a block structure that better fits the content structure in a picture.

To achieve efficient compression in the temporal domain, inter prediction techniques aims to explore the similarity among pictures. Inter prediction predicts a block in a current picture using previously decoded pictures. The previously decoded pictures are referred to as reference pictures of the current picture.

In a video encoder, a method called motion estimation may be used to find the most similar blocks in the reference pictures. The displacement between a current block and its reference block is motion vector (MV). A MV has two components, MV.x and MV.y, namely x- and y-directions. FIG. 2 illustrates an example of a MV between a current block and its reference block. The MV may be signaled in a video bitstream.

A video decoder may decode the MV from the video bitstream. The decoder may then apply a method called motion compensation that may use the MV to find the corresponding reference blocks in the reference pictures.

A block may be called an inter block if it is predicted from at least one reference block in a reference picture.

The number of reference blocks is not limited to one. In bi-directional motion compensation, two reference blocks can be used to further explore the temporal redundancy, e.g., the current block may be predicted from two previously decoded blocks. A picture that uses bi-directional motion compensation may be called a bi-predicted picture (B-picture). FIG. 3 illustrates an example of a block with bi-directional motion compensation.

A set of motion information may contain a MV (MV.x and MV.y) and a reference picture with a POC number. If bi-directional motion compensation is used, there may be two sets of motion information, e.g., Set 0 with MV0, POC1, and an associated block 0, and Set 1 with MV1, POC2, and an associated block 1, as illustrated in FIG. 3.

The following explanation of potential problems is a present realization as part of the present disclosure and is not to be construed as previously known by others. While computation of certain parameters may be supported in the VVC Specification Draft 6, depending on factors in the process, the computation may have reduced accuracy and may be inefficient.

SUMMARY

According to various embodiments of inventive concepts, a method of performing bi-directional optical flow, BDOF, processing for a video sequence including a plurality of images, with each image of the plurality of images including a plurality of blocks with bidirectional-predicted inter coding blocks is provided. The method includes obtaining a shifted pair of refinement parameters per a subblock of a bidirectional-predicted inter coding block, wherein the shifted pair of refinement parameters comprises a shifted first refinement parameter and a shifted second refinement parameter. The method includes determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

One advantage that can be achieved compared to the existing approach of the VVC Specification Draft 6 is that the two right-shifting operations per location in a 4×4 subblock can be avoided. A further advantage includes that, in various embodiments, a method may be provided that saves the number of shift operations. Various embodiments include two shifts for a pair of refinement parameters, e.g. refinement parameters Vx and Vy, for each subblock. Thus, for a CU of size 128×128, it requires only 1024×2=2048 number of shifts, which is only 6.25% of the number of shifts compared to in VVC Specification Draft 6.

According to other embodiments of inventive concepts, an electronic device for performing bi-directional optical flow, BDOF, processing for a video sequence including a plurality of images, with each image of the plurality of images including a plurality of blocks with bidirectional-predicted inter coding blocks is provided. The electronic device may include at least one processor and at least one memory connected to the at least one processor and storing program code that is executed by the at least one processor to perform operations. The operations include obtaining a shifted pair of refinement parameters per a subblock of a bidirectional-predicted inter coding block, wherein the shifted pair of refinement parameters comprises a shifted first refinement parameter and a shifted second refinement parameter. The operations include determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

According to further embodiments of inventive concepts, a computer program comprising program code to be executed by at least one processor of an electronic device, whereby execution of the program code causes the electronic device to perform operations is provided. The operations include obtaining a shifted pair of refinement parameters per a subblock of a bidirectional-predicted inter coding block, wherein the shifted pair of refinement parameters comprises a shifted first refinement parameter and a shifted second refinement parameter. The operations include determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

According to yet other embodiments of inventive concepts, a computer program product comprising a non-transitory storage medium including program code to be executed by at least one processor (402, 420) of an electronic device (410), whereby execution of the program code causes the electronic device to perform operations. The operations include obtaining a shifted pair of refinement parameters per a subblock of a bidirectional-predicted inter coding block, wherein the shifted pair of refinement parameters comprises a shifted first refinement parameter and a shifted second refinement parameter. The operations include determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
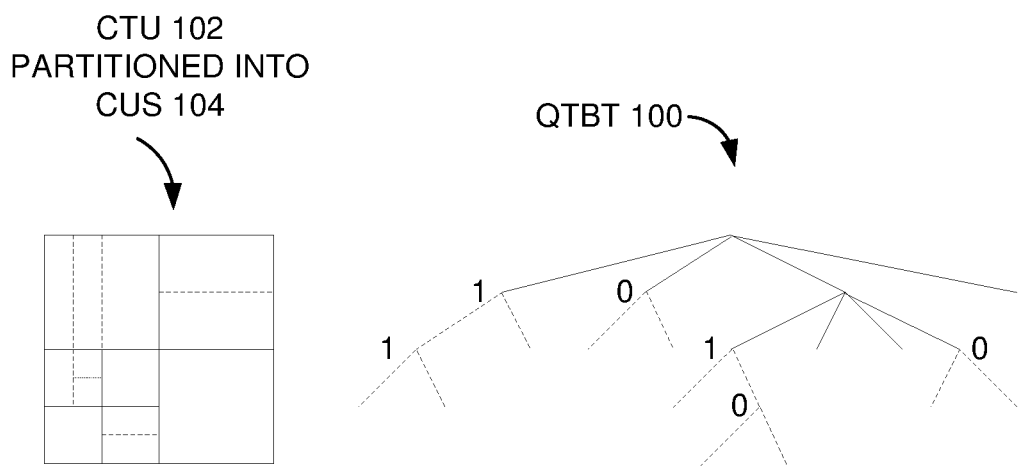
FIG. 1 shows an example of partitioning a coding tree unit into coding units using quadtree plus binary tree plus ternary tree block structure.
Figure 2:
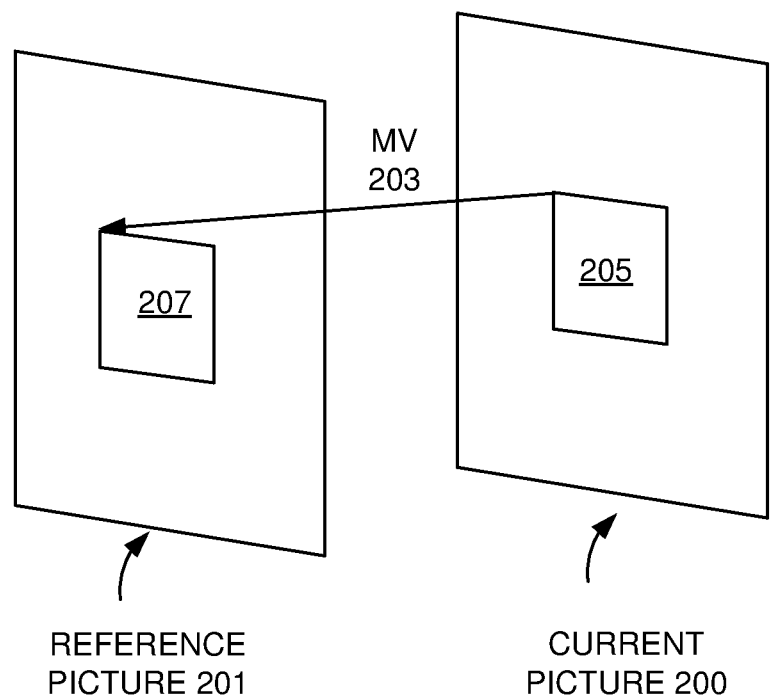
FIG. 2 shows an example of a motion vector between a current block and its reference block.
Figure 3:
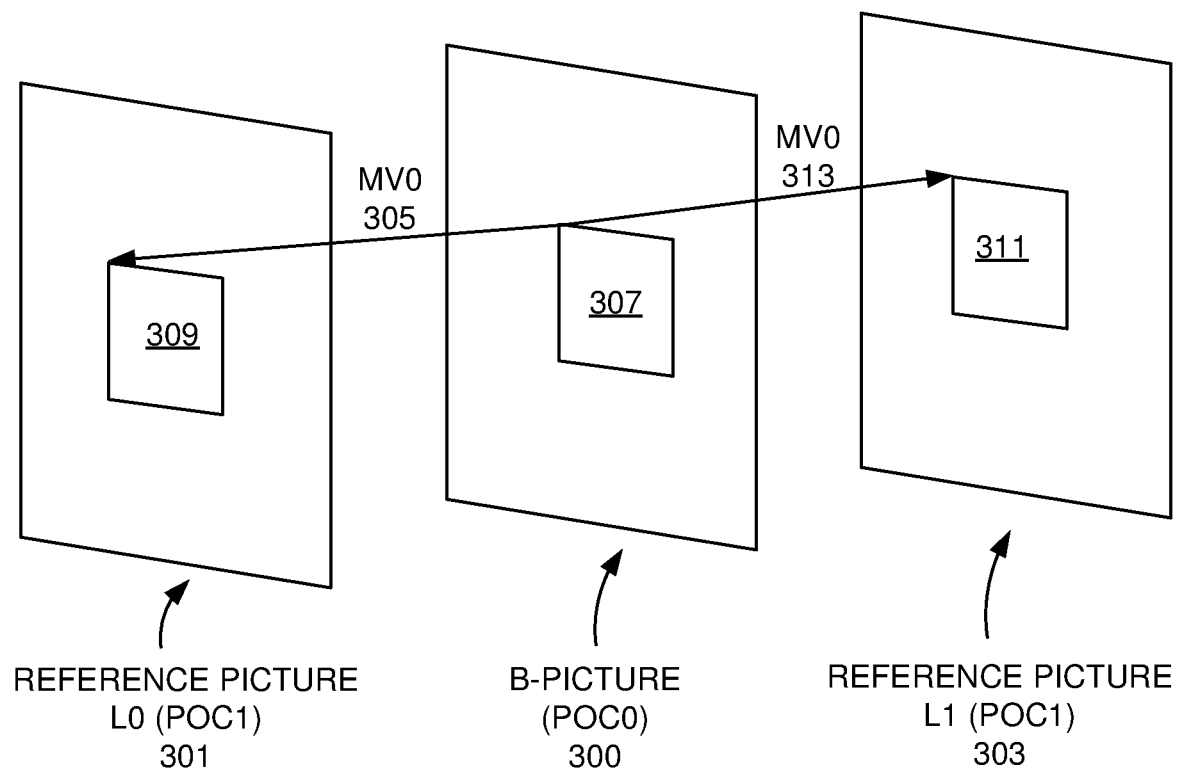
FIG. 3 shows an example of a block with bi-directional motion compensation.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

A bi-directional optical flow (BDOF) method may use the concept of optical flow and may be combined with bidirectional inter prediction to predict luma sample values in a current block. When a BDOF method is enabled for a bidirectional predicted inter block, it may derive a pair of refinement parameters Vx and Vy for each 4×4 subblock inside the inter block. The method may then further derive final prediction samples for each 4×4 subblock using the corresponding refinement parameters.

A general description of a BDOF method may be as follows. It should be noted that several steps in the method include using the most significant bits (MSB) while discarding the least significant bits (LSB) of the variables, where the MSB is achieved by right-shifting (denoted as >>) of the variable. Similarly, the left-shifting is denoted as <<.

Step 1: For a bi-predicted inter CU, generate a first prediction block predSampleL0 using a first motion vector mvL0, and generate a second prediction block predSampleL1 using a second motion vector mvL1.

Step 2: For each prediction block (predSampleL0 and predSampleL1), generate two gradient blocks gradientH and gradientV. Each entry in the gradientH is the MSB of horizontal gradient of the corresponding prediction sample. Each entry in the gradientV is the MSB of vertical gradient of the corresponding prediction sample. The gradient is computed by calculating the difference between two neighboring samples in the horizontal or vertical direction. The two gradient blocks generated from predSampleL0 are referred to as gradientHL0 and gradientVL0. The two gradient blocks generated from predSampleL1 are referred to as gradientHL1 and gradientVL1.

Step 3: Generate a prediction sample difference block diff using the two prediction blocks, predSampleL0 and predSampleL1. For each entry in the diff block, it is the MSB of the corresponding prediction sample difference in predSampleL0 and predSampleL1.

Step 4: Generate two gradient summation blocks, tempH and tempV. Each entry in the block tempH is calculated as the sum of corresponding entries in the two gradient blocks gradientHL0 and gradientHL1. Each entry in the block tempV is calculated as the sum of corresponding entries in the two gradient blocks gradientVL0 and gradientVL1.

Step 5: For a 4×4 subblock SB inside the inter CU, compute the BDOF correlation parameters (sGx2, sGy2, sGxGy, sGxd1 and sGyd1) using the MSB of the tempH, MSB of the tempV, both MSB and LSB of diff.

Step 6: Compute a pair of refinement parameters Vx and Vy using the BDOF correlation parameters (sGx2, sGy2, sGxGy, sGxd1 and sGyd1).

Step 7: Clip the refinement parameters Vx and Vy to be within a predefined value range.

Step 8: For each sample in the 4×4 subblock SB, calculate a BDOF offset (bdofOffset) using the values of Vx, Vy, and the corresponding entries in gradientHL0, gradientHL1, gradientVL0, and gradientVL1.

Step 9: For each sample in the 4×4 subblock, calculate its final prediction sample value using bdofOffset and the corresponding entries in predSampleL0 and gradientHL0.

In the VVC Specification Draft 6, BDOF follows the above process. The text of the BDOF process of the VVC Specification Draft 6 is shown below:

8.5.6.5 Bi-Directional Optical Flow Prediction Process
Inputs to this process are:
  two variables nCbW and nCbH specifying the width and the height of the current coding block,
  two (nCbW+2)×(nCbH+2) luma prediction sample arrays predSamplesL0 and predSamplesL1,
  the prediction list utilization flags predFlagL0 and predFlagL1,
  the reference indices refIdxL0 and refIdxL1,
  the bi-directional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.

Variables bitDepth, shift1, shift2, shift3, shift4, offset4, and mvRefineThres are derived as follows:
  The variable bitDepth is set equal to BitDepth$_Y$.

The variable shift1 is set to equal to Max(6, bitDepth−6).
The variable shift2 is set to equal to Max(4, bitDepth−8).
The variable shift3 is set to equal to Max(1, bitDepth−11).
The variable shift4 is set equal to Max(3, 15−bitDepth) and the variable offset4 is set equal to 1<<(shift4−1).
The variable mvRefineThres is set equal to 1<<Max(5, bitDepth−7).

For xIdx=0 . . . (nCbW>>2)−1 and yIdx=0 . . . (nCbH>>2)−1, the following applies:
  The variable xSb is set equal to (xIdx<<2)+1 and ySb is set equal to (yIdx<<2)+1.
  If bdofUtilizationFlag[xIdx][yIdx] is equal to FALSE, for x=xSb−1 . . . xSb+2, y=ySb−1 . . . ySb+2, the prediction sample values of the current subblock are derived as follows:

pbSamples[x][y]=Clip3(0,(2$^{bitDepth}$)−1, (predSamplesL0[x+1][y+1]+offset4+predSamplesL1[x+1][y+1])>>shift4)  (8-800)

Otherwise (bdofUtilizationFlag[xIdx][yIdx] is equal to TRUE), the prediction sample values of the current subblock are derived as follows:
  For x=xSb−1 . . . xSb+4, y=ySb−1 . . . ySb+4, the following ordered steps apply:
  1. The locations ($h_x$, $v_y$) for each of the corresponding sample locations (x, y) inside the prediction sample arrays are derived as follows:

$h_x$=Clip3(1,nCbW,x)  (8-801)

$v_y$=Clip3(1,nCbH,y)  (8-802)

2. The variables gradientHL0[x][y], gradientVL0[x][y], gradientHL1[x][y] and gradientVL1[x][y] are derived as follows:

gradientHL0[x][y]=(predSamplesL0[$h_x$+1][$v_y$]>>shift1)−(predSampleL0[$h_x$−1][$v_y$])>>shift1)  (8-803)

gradientVL0[x][y]=(predSampleL0[$h_x$][$v_y$+1]>>shift1)−(predSampleL0[$h_x$][$v_y$−1])>>shift1)  (8-804)

gradientHL1[x][y]=(predSamplesL1[$h_x$+1][$v_y$]>>shift1)−(predSampleL1[$h_x$−1][$v_y$])>>shift1)  (8-805)

gradientVL1[x][y]=(predSampleL1[$h_x$][$v_y$+1]>>shift1)−(predSampleL1[$h_x$][$v_y$−1])>>shift1)  (8-806)

3. The variables diff[x][y], tempH[x][y] and tempV[x][y] are derived as follows:

diff[x][y]=(predSamplesL0[$h_x$][$v_y$]>>shift2)−(predSamplesL1[$h_x$][$v_y$]>>shift2)  (8-807)

tempH[x][y]=(gradientHL0[x][y]+gradientHL1[x][y])>>shift3  (8-808)

tempV[x][y]=(gradientVL0[x][y]+gradientVL1[x][y])>>shift3  (8-809)

The variables sGx2, sGy2, sGxGy, sGxd1 and sGyd1 are derived as follows:

sGx2=$\Sigma_i\Sigma_j$ Abs(tempH[xSb+i][ySb+j]) with i,j=−1 . . . 4  (8-810)

sGy2=$\Sigma_i\Sigma_j$ Abs(tempV[xSb+i][ySb+j]) with i,j=−1 . . . 4  (8-811)

sGxGy=$\Sigma_i\Sigma_j$(Sign(tempV[xSb+i][ySb+j])*tempH[xSb+i][ySb+j]) with j=−1 . . . 4  (8-812)

$sGxGy_m=sGxGy\gg 12$ (8-813)

$sGxGy_s=sGxGy\&((1\ll 12)-1)$ (8-814)

$sGxdI=\Sigma_i\Sigma_j(-\text{Sign}(tempH[xSb+i][ySb+j])*\text{diff}[xSb+i][ySb+j])$ with $j=-1\ldots 4$ (8-815)

$sGydI=\Sigma_i\Sigma_j(-\text{Sign}(tempV[xSb+i][ySb+j])*\text{diff}[xSb+i][ySb+j])$ with $j=-1\ldots 4$ (8-816)

The horizontal and vertical motion offset of the current subblock are derived as:

$v_x=sGx2>0?\text{Clip3}(-mvRefineThres,mvRefineThres,-(sGxdI\ll 3)\gg\text{Floor}(\text{Log }2(sGx2))): 0$ (8-817)

$v_y=sGy2>0 ?\text{Clip3}(-mvRefineThres,mvRefineThres,((sGydI\ll 3)-((v_x*sGxGy_m)\ll 12+v_x*sGxGy_s)\gg 1)\gg\text{Floor}(\text{Log }2(sG\ y2))): 0$ (8-818)

For $x=xSb-1 \ldots xSb+2$, $y=ySb-1 \ldots ySb+2$, the prediction sample values of the current sub-block are derived as follows:

$bdofOffset=(v_x*(gradientHL0[x+1][y+1]-gradientHL1[x+1][y+1]))\gg 1+(v_y*(gradientVL0[x+1][y+1]-gradientVL1[x+1][y+1]))\gg 1$ (8-819)

$pbSamples[x][y]=\text{Clip3}(0,(2^{bitDepth})-1,(predSamplesL0[x+1][y+1]+offset4+predSamplesL1[x+1][y+1]+bdofOffset)\gg shift4)$ (8-820)

Referring to the VVC Specification Draft 6 shown above, the gradient calculations of step 2 above are specified as equation (8-803), (8-804), (8-805) and (8-806). The sample difference calculations in step 3 above are specified as equation (8-807).

The gradient summation calculations in step 4 above are specified as equation (8-808) and (8-809).

The BDOF correlation calculations in step 5 above are specified as equation (8-810), (8-811), (8-812), (8-813) and (8-814), where Abs( ) is the absolute value function and Sign( ) is the sign function.

The calculation of Vx and Vy in step 6 above and clipping operation in step 7 above are specified as equation (8-817) and (8-818).

The calculation of bdofOffset in step 8 above are specified as equation (8-819).

The generation of the final prediction samples in step 9 above are specified as equation (8-820).

While the VVC Specification Draft 6 includes a BDOF process, the computation of BDOF offset includes a right-shifting. Possible drawbacks to this approach include this shift is applied to every location [x][y] in the subblock of size 4×4. That is, every subblock requires 4×4×2=32 shifts to compute the offset. In a possible worst case, if a CU has a size of 128×128, it has 128×128/(4×4)=1024 subblocks. Thus, it requires 1024×32=32764 shifts, which is a large number of shift operations.

In various embodiments, a method may be provided for determining a BDOF offset that includes two shift operations to a pair of refinement parameters only once per 4×4 subblock.

Presently disclosed embodiments may provide potential advantages. One advantage compared to the existing approach of the VVC Specification Draft 6 is that the two right-shifting operations per location in a 4×4 subblock can be avoided. A further advantage includes that, in various embodiments, a method may be provided that saves the number of shift operations. Various embodiments include two shifts for a pair of refinement parameters, e.g. refinement parameters Vx and Vy, for each subblock. Thus, for a CU of size 128×128, it requires only 1024×2=2048 number of shifts, which is only 6.25% of the number of shifts compared to in VVC Specification Draft 6.

Figures 4, 5:
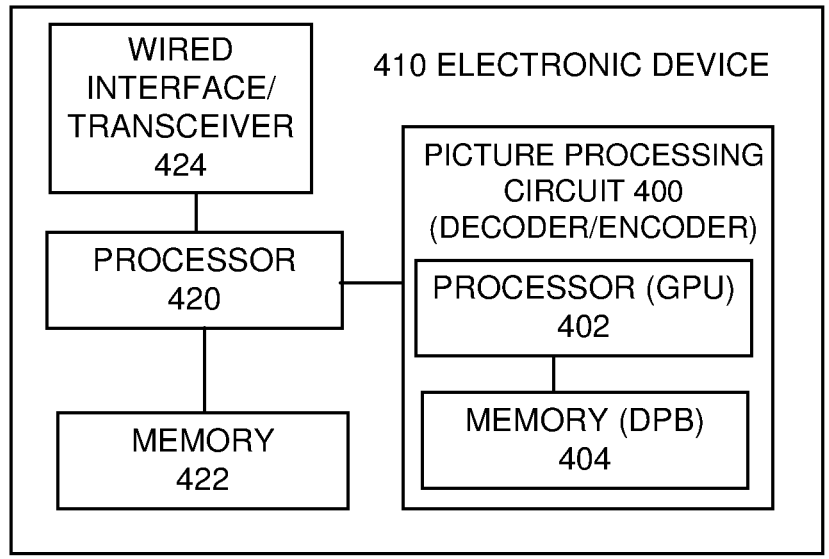
FIG. 4 is a block diagram illustrating an electronic device having a picture processing circuit that is configured according to some embodiments.
FIG. 5 shows an example of performance of a video encoder/decoder according to some embodiments.

FIG. 4 is a block diagram illustrating an electronic device 410 having a picture processing circuit 400 that is configured according to some embodiments. The picture processing circuit 400 may be a picture decoder circuit and/or a picture encoder circuit. The electronic device 410 can include, without limitation, a wireless terminal, a wireless communication device, a wireless communication terminal, a UE node/terminal/device, gaming console, video media player, etc. The electronic device 410 may be configured to provide wired and/or wireless communications. When configured for wireless communications, the electronic device 410 includes an antenna and a transceiver circuit 424 (also referred to as a transceiver) including a transmitter and a receiver configured to provide uplink and downlink radio communications with other electronic devices and/or a radio access network RAN node (e.g., a base station, eNB, gNB, network node, etc.) of a wireless communication network. Alternatively or additionally, the electronic device 410 may include a wired interface 424 configured for communications via a wire line with other electronic devices and/or network nodes. The electronic device 410 further includes a processor circuit 420 (also referred to as a processor) coupled to the interface 424, and a memory circuit 422 (also referred to as memory) coupled to the processor circuit 420. The processor 420 is also coupled to the picture processing circuit 400 which includes a processor 402 (e.g., a graphics processing unit) coupled to a memory 404 which can store a current picture in a series of pictures of a video sequence for encoding and/or decoding in accordance with any one or more of the embodiments disclosed herein. The memory 422 stores computer readable program code that when executed by the processor 420 causes the processor 420 to perform operations according to any one or more of the embodiments disclosed herein. According to other embodiments, the picture processing circuit 400 may be implemented as an application specific integrated circuit or other picture decoding circuit, and the operations thereof may be at least partially or entirely performed by the processor 420 executing operations from the memory 422. The electronic device 410 may receive a series of pictures of a video sequence from another UE, network node, removable memory device, a camera, etc., for decoding. The electronic device 410 may encode a series of pictures of a video sequence that is provided to another UE, network node, a removable memory device, etc.

FIG. 5 shows a table of objective performance from an implementation of a third exemplary embodiment according to inventive concepts, described further below, although other performances may be obtained without limitation to these embodiments. Referring to FIG. 5, a test was carried out on top of the VVC test model VTM-6.0. The numbers in the table of FIG. 5 show the relative bit-cost for a device that can encode and/or decode (also referred to as a codec) under test to achieve equivalent video quality as a reference codec. The reference codec used here was VTM-6.0 as is and the codec under test was VTM-6.0 modified according to the third exemplary embodiment. In FIG. 5, 0% means there is no bit-cost difference for the test and reference codec to achieve the same video quality. Based on the numbers, it is asserted that the simplification has marginal impact on the objective performance.

Exemplary embodiments are now described.

Operations of encoding and decoding performed by a picture processing circuit (e.g., picture processing circuit 400 of FIG. 4) will now be discussed with reference to exemplary embodiments. Modules (also referred to as units) may be stored in memory 404 of FIG. 4, and these modules may provide instructions so that when the instructions of a module are executed by processor 402, processor 402 performs respective operations according to any one or more of the embodiments disclosed herein.

In a first exemplary embodiment, a shift operation is applied to refinement parameters Vx and Vy before using the Vx and Vy for calculating the BDOF offset (bdofOffset) for each sample in a 4×4 subblock. In other words, the shifted Vx and Vy are instead used for the calculation of bdofOffset. The shift operation in computing bdofOffset for each sample in 4×4 subblock in VVC Specification Draft 6 is removed, as described below:

The operations include step 1: For a bi-predicted inter CU, generating a first prediction block predSampleL0 using a first motion vector mvL0, and generating a second prediction block predSampleL1 using a second motion vector mvL1.

The operations may further include step 2: For each prediction block (predSampleL0 and predSampleL1), generating two gradient blocks gradientH and gradientV. Each entry in the gradientH is the MSB of horizontal gradient of the corresponding prediction sample. Each entry in the gradientV is the MSB of vertical gradient of the corresponding prediction sample. The gradient is computed by calculating the difference between two neighboring samples in the horizontal or vertical direction. The two gradient blocks generated from predSampleL0 are referred to as gradientHL0 and gradientVL0. The two gradient blocks generated from predSampleL1 are referred to as gradientHL1 and gradientVL1.

The operations may further include step 3: Generating a prediction sample difference block diff using the two prediction blocks, predSampleL0 and predSampleL1. For each entry in the diff block, it is the MSB of the corresponding prediction sample difference in predSampleL0 and predSampleL0.

The operations may further include step 4: Generating two gradient summation blocks, tempH and tempV. Each entry in the block tempH is calculated as the sum of corresponding entries in the two gradient blocks gradientHL0 and gradientHL1. Each entry in the block tempV is calculated as the sum of corresponding entries in the two gradient blocks gradientVL0 and gradientVL1.

The operations may further include step 5: For a 4×4 subblock SB inside the inter CU, computing the BDOF correlation parameters (sGx2, sGy2, sGxGy, sGxdI and sGydI) using the MSB of the tempH, the MSB of the tempV, both MSB and LSB of diff.

The operations may further include step 6: Computing a pair of refinement parameters Vx and Vy using the BDOF correlation parameters (sGx2, sGy2, sGxGy, sGxdI and sGydI).

The operations may further include step 7: Clipping the refinement parameters Vx and Vy to be within a predefined value range.

The operations may further include step 8: Performing a shift operation on the refinement parameters Vx and Vy.

The operations may further include step 9: For each sample in the 4×4 subblock SB, calculating a BDOF offset (bdofOffset) using the shifted version of Vx, Vy, and the corresponding entries in gradientHL0, gradientHL1, gradientVL0, and gradientVL1.

The operations may further include step 10: For each sample in the 4×4 subblock, calculating its final prediction sample value using the bdofOffset and the corresponding entries in the predSampleL0 and gradientHL0.

In a second exemplary embodiment, the operations of the first exemplary embodiment are performed with the shift operation of step 8 implemented by directly right-shifting Vx and Vy by 1 bit. That is, $v_x = v_x >> 1$,
$v_y = v_y >> 1$.

The second exemplary embodiment is illustrated below (which shows changes with underlining and strikethroughs to the BDOF method of the VVC Specification Draft 6 shown above):

8.5.6.5 Bi-Directional Optical Flow Prediction Process
Inputs to this process are:
two variables nCbW and nCbH specifying the width and the height of the current coding block,
two (nCbW+2)×(nCbH+2) luma prediction sample arrays predSamplesL0 and predSamplesL1,
the prediction list utilization flags predFlagL0 and predFlagL1,
the reference indices refIdxL0 and refIdxL1,
the bi-directional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.
Variables bitDepth, shift1, shift2, shift3, shift4, offset4, and mvRefineThres are derived as follows:
The variable bitDepth is set equal to BitDepthy.
The variable shift1 is set to equal to Max(6, bitDepth−6).
The variable shift2 is set to equal to Max(4, bitDepth−8).
The variable shift3 is set to equal to Max(1, bitDepth−11).
The variable shift4 is set equal to Max(3, 15−bitDepth) and the variable offset4 is set equal to 1<<(shift4−1).
The variable mvRefineThres is set equal to 1<<Max(5, bitDepth−7).

For xIdx=0 . . . (nCbW>>2)−1 and yIdx=0 . . . (nCbH>>2)−1, the following applies:
The variable xSb is set equal to (xIdx<<2)+1 and ySb is set equal to (yIdx<<2)+1.
If bdofUtilizationFlag[xIdx][yIdx] is equal to FALSE, for x=xSb−1 . . . Sb+2, y=ySb−1 . . . ySb+2, the prediction sample values of the current subblock are derived as follows:

pbSamples[x][y]=Clip3(0,(2$^{bitDepth}$)−1, (predSamplesL0[x+1][y+1]+offset4+predSamplesL1[x+1][y+1])>>shift4)    (8-800)

Otherwise (bdofUtilizationFlag[xIdx][yIdx] is equal to TRUE), the prediction sample values of the current subblock are derived as follows:
For x=xSb−1 . . . xSb+4, y=ySb−1 . . . ySb+4, the following ordered steps apply:
  4. The locations ($h_x$, $v_y$) for each of the corresponding sample locations (x, y) inside the prediction sample arrays are derived as follows:

$h_x$=Clip3(1,nCbW,x)    (8-801)

$v_y$=Clip3(1,nCbH,y)    (8-802)

5. The variables gradientHL0[x][y], gradientVL0[x][y], gradientHL1[x][y] and gradientVL1[x][y] are derived as follows:

gradientHL0[x][y]=(predSamplesL0[$h_x$+1][$v_y$]>>shift1)−(predSampleL0[$h_x$−1][$v_y$])>>shift1)    (8-803)

$$\text{gradientVL0}[x][y]=(\text{predSampleL0}[h_x][v_y+1])\text{>>shift1})-(\text{predSampleL0}[h_x][v_y-1])\text{>>shift1}) \quad (8\text{-}804)$$

$$\text{gradientHL1}[x][y]=(\text{predSamplesL1}[h_x+1][v_y])\text{>>shift1})-(\text{predSampleL1}[h_x-1][v_y])\text{>>shift1}) \quad (8\text{-}805)$$

$$\text{gradientVL1}[x][y]=(\text{predSampleL1}[h_x][v_y+1])\text{>>shift1})-(\text{predSampleL1}[h_x][v_y-1])\text{>>shift1}) \quad (8\text{-}806)$$

6. The variables diff[x][y], tempH[x][y] and tempV[x][y] are derived as follows:

$$\text{diff}[x][y]=(\text{predSamplesL0}[h_x][v_y]\text{>>shift2})-(\text{predSamplesL1}[h_x][v_y]\text{>>shift2}) \quad (8\text{-}807)$$

$$\text{tempH}[x][y]=(\text{gradientHL0}[x][y]+\text{gradientHL1}[x][y])\text{>>shift3} \quad (8\text{-}808)$$

$$\text{tempV}[x][y]=(\text{gradientVL0}[x][y]+\text{gradientVL1}[x][y])\text{>>shift3} \quad (8\text{-}809)$$

The variables sGx2, sGy2, sGxGy, sGxdI and sGydI are derived as follows:

$$\text{sGx2}=\rho_i\Sigma_j\ \text{Abs}(\text{tempH}[xSb+i][ySb+j]) \text{ with } i,j= -1 \ldots 4 \quad (8\text{-}810)$$

$$\text{sGy2}=\Sigma_i\Sigma_j\text{Abs}(\text{tempV}[xSb+i][ySb+j]) \text{ with } i,j= -1 \ldots 4 \quad (8\text{-}811)$$

$$\text{sGxGy}=\Sigma_i\Sigma_j(\text{Sign}(\text{tempV}[xSb+i][ySb+j])*\text{tempH}[xSb+i][ySb+j]) \text{ with } j=-1\ldots 4 \quad (8\text{-}812)$$

$$\text{sGxGy}_m=\text{sGxGy}\text{>>}12 \quad (8\text{-}813)$$

$$\text{sGxGy}_s=\text{sGxGy}\&\ ((1\text{<<}12)-1) \quad (8\text{-}814)$$

$$\text{sGxdI}=\Sigma_i\Sigma_j(-\text{Sign}(\text{tempH}[xSb+i][ySb+j])*\text{diff}[xSb+i][ySb+j]) \text{ with } j=-1\ldots 4 \quad (8\text{-}815)$$

$$\text{sGydI}=\Sigma_i\Sigma_j(-\text{Sign}(\text{tempV}[xSb+i][ySb+j])*\text{diff}[xSb+i][ySb+j]) \text{ with } j=-1\ldots 4 \quad (8\text{-}816)$$

The horizontal and vertical motion offset of the current subblock are derived as:

$$v_x=\text{sGx2>0?Clip3}(-\text{mvRefineThres},\text{mvRefineThres},-(\text{sGxdI<<3})\text{>>Floor}(\text{Log 2}(\text{sGx2}))): 0 \quad (8\text{-}817)$$

$$v_y=\text{sGy2>0 ?Clip3}(-\text{mvRefineThres},\text{mvRefineThres},((\text{sGydI<<3})-((v_x*\text{sGxGy}_m)\text{<<}12+v_x*\text{sGxGy}_s)\text{>>}1)\text{>>Floor}(\text{Log 2}(\text{sG }y2))): 0 \quad (8\text{-}818)$$

$v_x$ is further modified as $v_x=v_x\text{>>}1$, and $v_x$ is further modified as $v_x=v_x\text{>>}1$ For x=xSb−1 . . . xSb+2, y=ySb−1 . . . ySb+2, the prediction sample values of the current sub-block are derived as follows:

$$\text{bdofOffset}=(v_x*(\text{gradientHL0}[x+1][y+1]-\text{gradientHL1}[x+1][y+1]))\text{>>}\cancel{1}+(v_y*(\text{gradientVL0}[x+1][y+1]-\text{gradientVL1}[x+1][y+1]))\text{>>}\cancel{1} \quad (8\text{-}819)$$

$$\text{pbSamples}[x][y]=\text{Clip3}(0,(2^{bitDepth})-1,(\text{predSamplesL0}[x+1][y+1]+\text{offset4}+\text{predSamplesL1}[x+1][y+1]+\text{bdofOffset})\text{>>shift4}) \quad (8\text{-}820)$$

As shown in the second exemplary embodiment above, the operation of directly right-shifting Vx and Vy by 1 bit is performed to obtain the shifted Vx and Vy refinement parameters. The two right-shifting operations per location in a 4×4 subblock in determining bdofOffset are removed.

In a third exemplary embodiment, the operations of the first exemplary embodiment are performed with the shift operation of step 8 implemented by adding an offset 1 before right-shifting. That is, $v_x=(v_x+1)\text{>>}1$,
$v_y=(v_y+1)\text{>>}1$.

The third exemplary embodiment is illustrated below (which shows changes with underlining and strikethroughs to the BDOF method of the VVC Specification Draft 6 shown above):

8.5.6.5 Bi-Directional Optical Flow Prediction Process
Inputs to this process are:
  two variables nCbW and nCbH specifying the width and the height of the current coding block,
  two (nCbW+2)×(nCbH+2) luma prediction sample arrays predSamplesL0 and predSamplesL1,
  the prediction list utilization flags predFlagL0 and predFlagL1,
  the reference indices refIdxL0 and refIdxL1,
  the bi-directional optical flow utilization flags bdofUtilizationFlag[xIdx][yIdx] with xIdx=0 . . . (nCbW>>2)−1, yIdx=0 . . . (nCbH>>2)−1.
Output of this process is the (nCbW)×(nCbH) array pbSamples of luma prediction sample values.
The horizontal and vertical motion offset of the current subblock are derived as:

$$v_x=\text{sGx2>0?Clip3}(-\text{mvRefineThres},\text{mvRefineThres},-(\text{sGxdI<<3})\text{>>Floor}(\text{Log2}(\text{sGx2}))): 0 \quad (8\text{-}817)$$

$$v_y=\text{sGy2>0 ?Clip3}(-\text{mvRefineThres},\text{mvRefineThres},((\text{sGydI<<3})-((v_x*\text{sGxGy}_m)\text{<<}12+v_x*\text{sGxGy}_s)\text{>>}1)\text{>>Floor}(\text{Log2}(\text{sG }y2))): 0 \quad (8\text{-}818)$$

$v_x$ is further modified as $v_x=(v_x+1)\text{>>}1$, and $v_x$ is further modified as $v_x=(v_y+1)\text{>>}1$ For x=xSb−1 . . . xSb+2, y=ySb−1 . . . ySb+2, the prediction sample values of the current sub-block are derived as follows:

$$\text{bdofOffset}=(v_x*(\text{gradientHL0}[x+1][y+1]-\text{gradientHL1}[x+1][y+1]))\text{>>}\cancel{1}+(v_y*(\text{gradientVL0}[x+1][y+1]-\text{gradientVL1}[x+1][y+1]))\text{>>}\cancel{1} \quad (8\text{-}819)$$

$$\text{pbSamples}[x][y]=\text{Clip3}(0,(2^{bitDepth})-1,(\text{predSamplesL0}[x+1][y+1]+\text{offset4}+\text{predSamplesL1}[x+1][y+1]+\text{bdofOffset})\text{>>shift4}) \quad (8\text{-}820)$$

As shown in the third exemplary embodiment above, the shift operation of adding an offset 1 before right-shifting is performed to obtain the shifted Vx and Vy refinement parameters. The two right-shifting operations per location in a 4×4 subblock in determining bdofOffset are removed.

These and other related operations will now be described in the context of the operational flowchart of FIG. 6 that may be performed by a video encoder and/or a video decoder.

Figure 6:
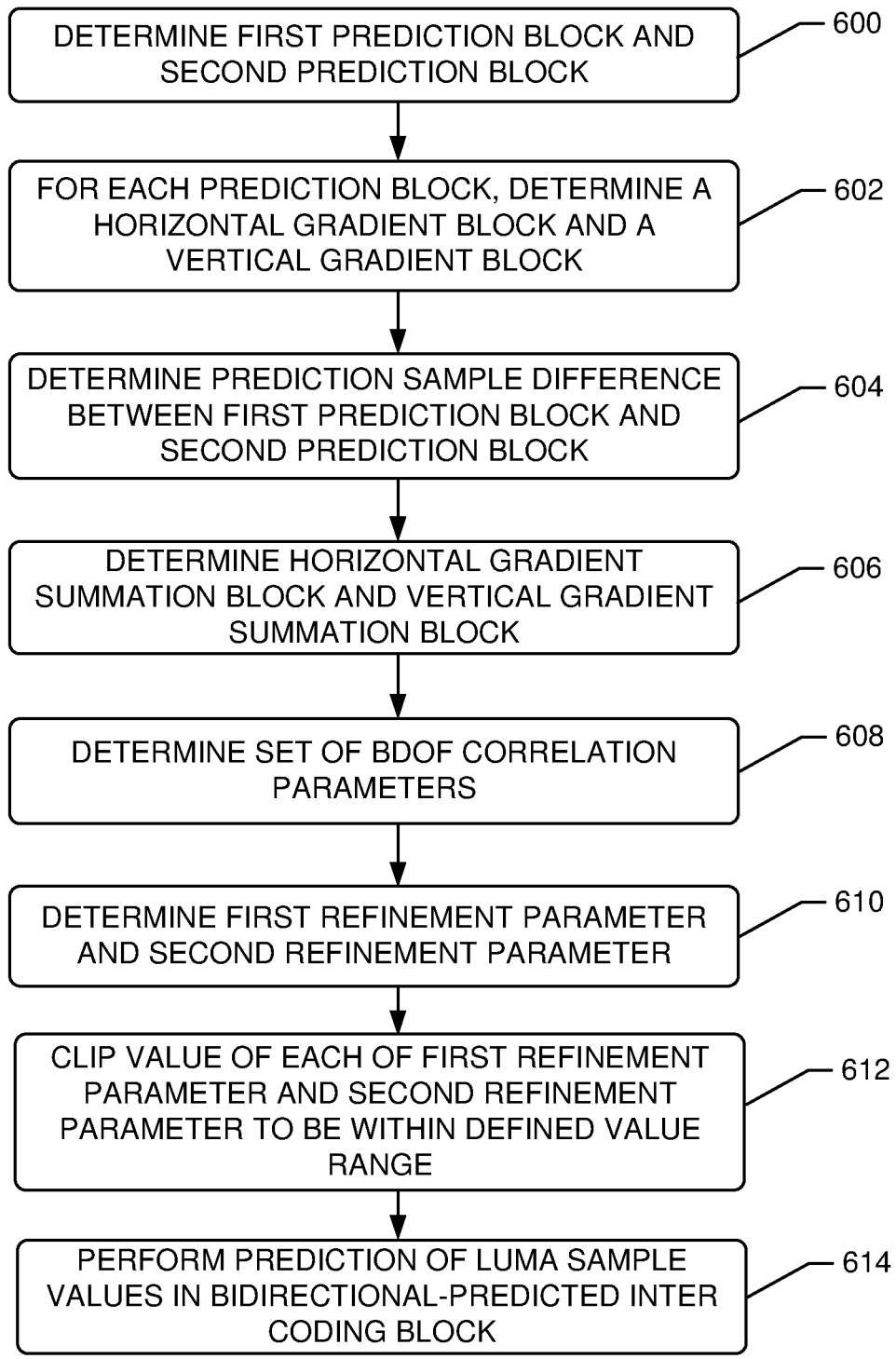
FIG. 6 is a flowchart of operations that may be performed by a picture encoding circuit and/or a picture decoding circuit for determining bi-directional optical flow correlation parameters for performing prediction of luma sample values during encoding and/or decoding of video, in accordance with some embodiments of the present disclosure.

FIG. 6 is a flowchart of operations that can be performed by a picture decoding circuit and/or a picture encoding circuit determining a BDOF offset that includes two shift operations to a pair of refinement parameters only once per 4×4 subblock for performing prediction of luma sample values during encoding and/or decoding of video, according to some embodiments. The operations of FIG. 6 may more generally be performed by a picture processing circuit, which may be a picture decoder circuit and/or a picture decoder circuit (e.g., picture processing circuit 400 in FIG. 4).

Referring to FIG. 6, the operations include, for each bidirectional-predicted inter coding block, determining (600) a first prediction block using a first motion vector and a second prediction block using a second motion vector. The operations may further include, for each of the prediction blocks, determining (602) a first horizontal gradient block and a first vertical gradient block for the first prediction block and a second horizontal gradient block and a second vertical gradient block for the second prediction block.

The operations may further include determining (604) a prediction sample difference block between the first prediction block and the second prediction block.

The operations may further include determining (606) each of a horizontal gradient summation block (tempH) and a vertical gradient summation block (tempV), wherein the horizontal gradient summation block (tempH) is determined by summing the first horizontal gradient block and the second horizontal gradient block and the vertical summation gradient block (tempV) is determined by summing the first vertical gradient block and the second vertical gradient block.

Still referring to FIG. 6, the operations may further include, for each subblock within each bidirectional-predicted inter coding block, determining (608) a set of bidirectional optical flow correlation parameters using a most significant bit of the horizontal gradient summation block (tempH), a most significant bit of the vertical gradient summation block (tempV), and a most significant bit and a least significant bit of the prediction sample difference block.

The operations may further include determining (610) a first refinement parameter and a second refinement parameter using the set of bidirectional optical flow correlation parameters.

The operations may further include clipping (612) the value of each of the first refinement parameter and the second refinement parameter to be within a defined value range.

The operations may further include performing (614) a shift operation on each of the first refinement parameter and the second refinement parameter to obtain a shifted first refinement parameter and a shifted second refinement parameter.

The operations may further include, for each sample in each subblock within each bidirectional-predicted inter coding block, determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block.

In some embodiments, the performing (614) a shift operation on each of the first refinement parameter and the second refinement parameter to obtain a shifted first refinement parameter and a shifted second refinement parameter is performed by directly right-shifting each of the first refinement parameter and the second refinement parameter by one bit.

In some embodiments, the first refinement parameter is a variable denoted by vx and the second refinement parameter is a variable denoted by vy, and wherein directly right-shifting of each of the first refinement parameter (vx) and the second refinement parameter (vy) by one bit comprises:

$v_x = v_x >> 1$; and
$v_y = v_y >> 1$ where >> denotes right-shifting of the variable.

In some embodiments, the determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block includes:

bdofOffset=$(v_x$*(gradientHL0[x+1][y+1]−gradientHL1[x+1][y+1]))+$(v_y$*(gradientVL0[x+1][y+1]−gradientVL1[x+1][y+1]))

where bdofOffset is the bidirectional optical flow offset, $v_x$ is the directly right-shifted first refinement parameter, $v_y$ is the directly right-shifted second refinement parameter, gradietHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

In some embodiments, the performing (614) a shift operation on each of the first refinement parameter and the second refinement parameter to obtain a shifted first refinement parameter and a shifted second refinement parameter is performed by adding an offset to each of the first refinement parameter and the second refinement parameter before right-shifting.

In some embodiments, the first refinement parameter is a variable denoted by vx and the second refinement parameter is a variable denoted by vy, and wherein adding an offset to each of the first refinement parameter and the second refinement parameter before right-shifting comprises:

$v_x = (v_x+1) >> 1$; and
$v_y = (v_y+1) >> 1$ where >> denotes right-shifting of the variable.

In some embodiments, the determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block comprises:

bdofOffset=$(v_x$*(gradientHL0[x+1][y+1]−gradientHL1[x+1][y+1]))+$(v_y$*(gradientVL0[x+1][y+1]−gradientVL1[x+1][y+1]))

where bdofOffset is the bidirectional optical flow offset, $v_x$ is the first refinement parameter having an added offset and right-shifting, $v_y$ is the second refinement parameter having an added offset and right-shifting, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

Still referring to FIG. 6, the operations may further include performing (618) prediction of luma sample values in each bidirectional-predicted inter coding block using a prediction sample value for each sample in each subblock within each bidirectional-predicted inter coding block by using the bidirectional optical flow offset, the first prediction block, and the first horizontal gradient block.

Figure 7:
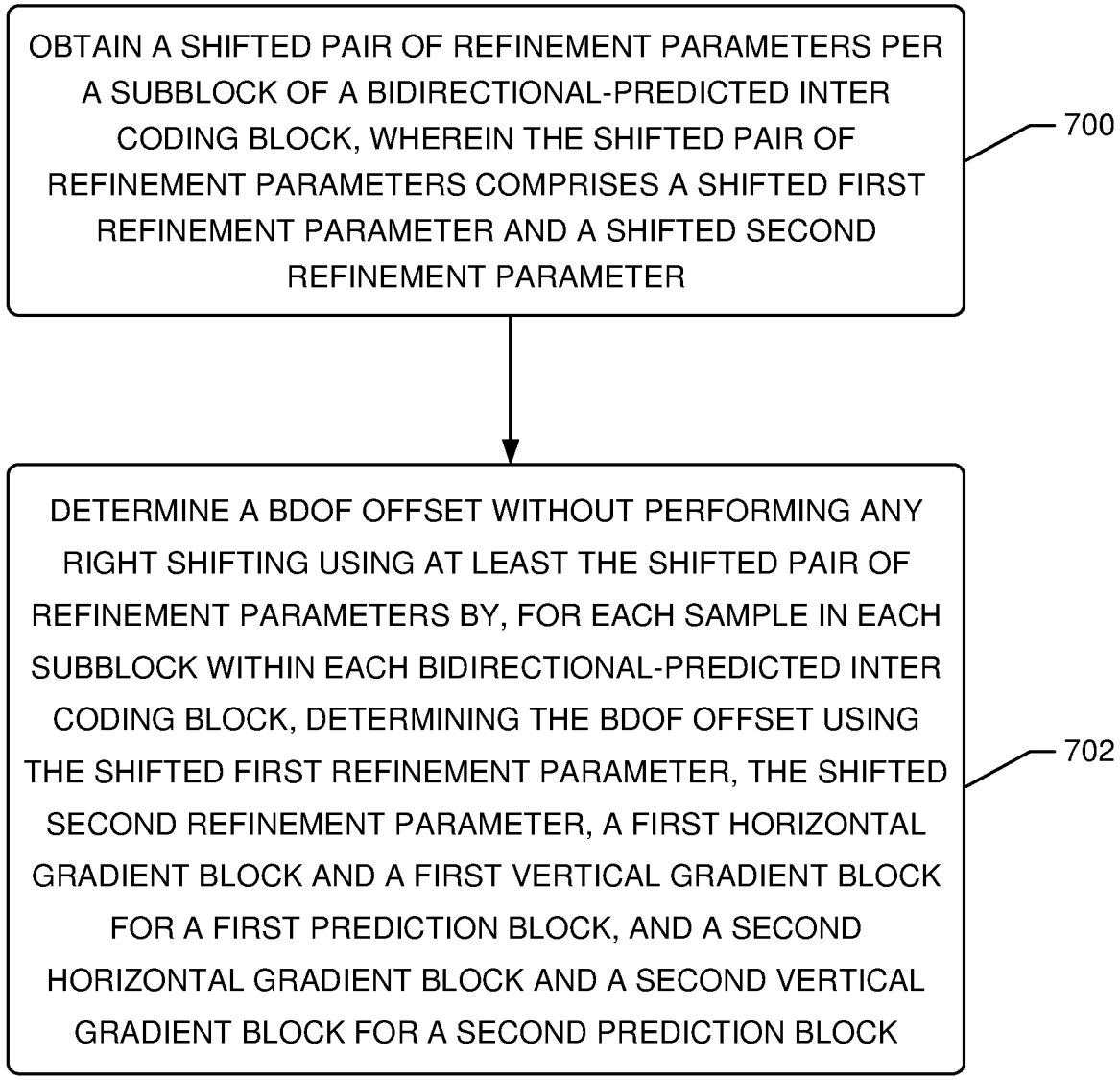
FIG. 7 is a flowchart of operations that may be performed by a picture encoding circuit and/or a picture decoding circuit for determining bi-directional optical flow correlation parameters in accordance with some embodiments of the present disclosure.

Thus, turning to FIG. 7, the picture processing circuit in performing the operations obtains a shifted pair of refinement parameters per a subblock of a bidirectional-predicted inter coding block to obtain a shifted pair of refinement parameters in block 700, wherein the shifted pair of refinement parameters include a shifted first refinement parameter and a shifted second refinement parameter. In block 702, the picture processing circuit determines a bi-directional optical flow, BDOF, offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Example Embodiments are discussed below. Reference numbers/letters are provided in parenthesis by way of example/illustration without limiting example embodiments to particular elements indicated by reference numbers/letters.

Listing of Embodiments

Embodiment 1. A method of processing a video sequence including a plurality of images, with each image of the plurality of images including a plurality of blocks with bidirectional-predicted inter coding blocks, the method comprising:
  for each bidirectional-predicted inter coding block, determining (600) a first prediction block using a first motion vector and a second prediction block using a second motion vector;
  for each of the prediction blocks, determining (602) a first horizontal gradient block and a first vertical gradient block for the first prediction block and a second horizontal gradient block and a second vertical gradient block for the second prediction block;
  determining (604) a prediction sample difference block between the first prediction block and the second prediction block;
  determining (606) each of a horizontal gradient summation block and a vertical gradient summation block, wherein the horizontal gradient summation block is determined by summing the first horizontal gradient block and the second horizontal gradient block and the vertical summation gradient block is determined by summing the first vertical gradient block and the second vertical gradient block;

for each subblock within each bidirectional-predicted inter coding block, determining (608) a set of bidirectional optical flow correlation parameters using a most significant bit of the horizontal gradient summation block, a most significant bit of the vertical gradient summation block, and a most significant bit and a least significant bit of the prediction sample difference block;

determining (610) a first refinement parameter and a second refinement parameter using the set of bidirectional optical flow correlation parameters;

clipping (612) the value of each of the first refinement parameter and the second refinement parameter to be within a defined value range;

performing (614) a shift operation on each of the first refinement parameter and the second refinement parameter to obtain a shifted first refinement parameter and a shifted second refinement parameter;

for each sample in each subblock within each bidirectional-predicted inter coding block, determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block; and performing (618) prediction of luma sample values in each bidirectional-predicted inter coding block using a prediction sample value for each sample in each subblock within each bidirectional-predicted inter coding block by using the bidirectional optical flow offset, the first prediction block, and the first horizontal gradient block.

Embodiment 2. The method of Embodiment 1, wherein the performing (614) a shift operation on each of the first refinement parameter and the second refinement parameter to obtain a shifted first refinement parameter and a shifted second refinement parameter is performed by directly right-shifting each of the first refinement parameter and the second refinement parameter by one bit.

Embodiment 3. The method of any of Embodiments 1 to 2, wherein the first refinement parameter is a variable denoted by $v_x$ and the second refinement parameter is a variable denoted by $v_y$, and wherein directly right-shifting of each of the first refinement parameter ($v_x$) and the second refinement parameter ($v_y$) by one bit comprises:

$v_x = v_x >> 1$; and
$v_y = v_y >> 1$ where $>>$ denotes right-shifting of the variable.

Embodiment 4. The method of any of Embodiments 1 to 3, wherein the determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block comprises:

$$bdofOffset=(v_x*(gradientHL0[x+1][y+1]-gradientHL1[x+1][y+1]))+(v_y*(gradientVL0[x+1][y+1]-gradientVL1[x+1][y+1]))$$

where bdofOffset is the bidirectional optical flow offset, $v_x$ is the directly right-shifted first refinement parameter, $v_y$ is the directly right-shifted second refinement parameter, gradietHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

5. The method of Embodiment 1, wherein the performing (614) a shift operation on each of the first refinement parameter and the second refinement parameter to obtain a shifted first refinement parameter and a shifted second refinement parameter is performed by adding an offset to each of the first refinement parameter and the second refinement parameter before right-shifting.

Embodiment 6. The method of Embodiment 5, wherein the first refinement parameter is a variable denoted by $v_x$ and the second refinement parameter is a variable denoted by $v_y$, and wherein adding an offset to each of the first refinement parameter and the second refinement parameter before right-shifting comprises:

$v_x = (v_x+1) >> 1$; and
$v_y = (v_y+1) >> 1$ where $>>$ denotes right-shifting of the variable.

Embodiment 7. The method of any of Embodiments 5 to 6, wherein the determining (616) a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block comprises:

$$bdofOffset=(v_x*(gradientHL0[x+1][y+1]-gradientHL1[x+1][y+1]))+(v_y*(gradientVL0[x+1][y+1]-gradientVL1[x+1][y+1]))$$

where bdofOffset is the bidirectional optical flow offset, $v_x$ is the first refinement parameter having an added offset and right-shifting, $v_y$ is the second refinement parameter having an added offset and right-shifting, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

Embodiment 8. An electronic device (410) adapted to perform operations according to any of Embodiments 1 through 7.

Embodiment 9. An electronic device (410) comprising:
a processor (402) configured to perform operations according to any of Embodiments 1 through 7.

Embodiment 10. An electronic device (410) configured to perform operations comprising:

for each bidirectional-predicted inter coding block, determining a first prediction block using a first motion vector and a second prediction block using a second motion vector;

for each of the prediction blocks, determining a first horizontal gradient block and a first vertical gradient block for the first prediction block and a second horizontal gradient block and a second vertical gradient block for the second prediction block;

determining a prediction sample difference block between the first prediction block and the second prediction block;

determining each of a horizontal gradient summation block and a vertical gradient summation block, wherein the horizontal gradient summation block is determined by summing the first horizontal gradient block and the second horizontal gradient block and the vertical summation gradient block is determined by summing the first vertical gradient block and the second vertical gradient block;

for each subblock within each bidirectional-predicted inter coding block, determining a set of bidirectional optical flow correlation parameters using a most significant bit of the horizontal gradient summation block, a most significant bit of the vertical gradient summation block, and a most significant bit and a least significant bit of the prediction sample difference block;

determining a first refinement parameter and a second refinement parameter using the set of bidirectional optical flow correlation parameters;

clipping the value of each of the first refinement parameter and the second refinement parameter to be within a defined value range;

performing a shift operation on each of the first refinement parameter and the second refinement parameter to obtain a shifted first refinement parameter and a shifted second refinement parameter;

for each sample in each subblock within each bidirectional-predicted inter coding block, determining a bidirectional optical flow offset using the shifted first refinement parameter, the shifted second refinement parameter, the first horizontal gradient block and the first vertical gradient block for a first prediction block, and the second horizontal gradient block and the second horizontal gradient block for the second prediction block; and performing prediction of luma sample values in each bidirectional-predicted inter coding block using a prediction sample value for each sample in each subblock within each bidirectional-predicted inter coding block by using the bidirectional optical flow offset, the first prediction block, and the first horizontal gradient block.

Further definitions are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of performing bi-directional optical flow, BDOF, processing for a video sequence including a plurality of images, with each image of the plurality of images including a plurality of blocks with bidirectional-predicted inter coding blocks, the method comprising:
    obtaining a shifted pair of refinement parameters per a subblock of a bidirectional-predicted inter coding block, wherein the shifted pair of refinement parameters comprises a shifted first refinement parameter and a shifted second refinement parameter; and
    determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

2. The method of claim 1, further comprising:
    for each bidirectional-predicted inter coding block, determining a first prediction block using a first motion vector and a second prediction block using a second motion vector;
    for each of the prediction blocks, determining a first horizontal gradient block and a first vertical gradient block for the first prediction block and a second horizontal gradient block and a second vertical gradient block for the second prediction block;
    determining a prediction sample difference block between the first prediction block and the second prediction block;
    determining each of a horizontal gradient summation block and a vertical gradient summation block, wherein the horizontal gradient summation block is determined by summing the first horizontal gradient block and the second horizontal gradient block and the vertical summation gradient block is determined by summing the first vertical gradient block and the second vertical gradient block;
    for each subblock within each bidirectional-predicted inter coding block, determining a set of BDOF correlation parameters using a most significant bit of the horizontal gradient summation block, a most significant bit of the vertical gradient summation block, and a most significant bit and a least significant bit of the prediction sample difference block;
    determining the first refinement parameter and the second refinement parameter using the set of BDOF correlation parameters;
    clipping a value of each of the first refinement parameter and the second refinement parameter to be within a defined value range; and
    performing prediction of luma sample values in each bidirectional-predicted inter coding block using a prediction sample value for each sample in each subblock within each bidirectional-predicted inter coding block by using the BDOF offset, the first prediction block, and the first horizontal gradient block.

3. The method of claim 1, wherein obtaining the shifted pair of refinement parameters comprises directly right-shifting each of the first refinement parameter and the second refinement parameter by one bit.

4. The method of claim 3, wherein the first refinement parameter is a variable denoted by $v_x$ and the second refinement parameter is a variable denoted by $v_y$, and wherein directly right-shifting of each of the first refinement parameter ($v_x$) and the second refinement parameter ($v_y$) by one bit is determined in accordance with:

$v_x = v_x >> 1$; and
$v_y = v_y >> 1$
where >>denotes right-shifting of the variable.

5. The method of claim 1, wherein the determining the BDOF offset without performing any right shifting using the shifted pair of refinement parameters is determined in accordance with:

bdofOffset=($v_x$*(gradientHL0[x+1][y+1]−gradientHL1[x+1][y+1]))+($v_y$*(gradientVL0[x+1][y+1]−gradientVL1[x+1][y+1]))

where bdofOffset is the bidirectional optical flow offset BDOF offset, $v_x$ is the first refinement parameter, $v_y$ is the second refinement parameter, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

6. The method of claim 1, wherein obtaining the shifted pair of refinement parameters per a subblock of a bidirectional-predicted inter coding block to obtain a shifted pair of refinement parameters comprises adding an offset to each of the first refinement parameter and the second refinement parameter before right-shifting.

7. The method of claim 6, wherein the first refinement parameter is a variable denoted by $v_x$ and the second refinement parameter is a variable denoted by $v_y$, and wherein adding an offset to each of the first refinement parameter and the second refinement parameter before right-shifting is performed in accordance with:
$v_x = (v_x+1) >> 1$; and
$v_y = (v_y+1) >> 1$
where >>denotes right-shifting of the variable.

8. The method of claim 6, wherein the determining a BDOF offset without performing any right shifting using the shifted pair of refinement parameters comprises:

bdofOffset=($v_x$*(gradientHL0[x+1][y+1]−gradientHL1[x+1][y+1]))+($v_y$*(gradientVL0[x+1][y+1]−gradientVL1[x+1][y+1]))

where bdofOffset is the bidirectional optical flow offset BDOF offset, $v_x$ is the first refinement parameter having an added offset, $v_y$ is the second refinement parameter having an added offset, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

9. An electronic device for performing bi-directional optical flow, BDOF, processing for a video sequence including a plurality of images, with each image of the plurality of images including a plurality of blocks with bidirectional-predicted inter coding blocks, the electronic device comprising:
at least one processor;
at least one memory connected to the at least one processor and storing program code that is executed by the at least one processor to perform operations comprising:
obtaining a shifted pair of refinement parameters per a subblock of a bidirectional-predicted inter coding block, wherein the shifted pair of refinement parameters comprises a shifted first refinement parameter and a shifted second refinement parameter; and
determining a BDOF offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

10. The electronic device of claim 9, wherein the at least one memory stores further program code that is executed by the at least one processor to perform operations further comprising:
for each bidirectional-predicted inter coding block, determining a first prediction block using a first motion vector and a second prediction block using a second motion vector;
for each of the prediction blocks, determining a first horizontal gradient block and a first vertical gradient block for the first prediction block and a second horizontal gradient block and a second vertical gradient block for the second prediction block;
determining a prediction sample difference block between the first prediction block and the second prediction block;
determining each of a horizontal gradient summation block and a vertical gradient summation block, wherein the horizontal gradient summation block is determined by summing the first horizontal gradient block and the second horizontal gradient block and the vertical summation gradient block is determined by summing the first vertical gradient block and the second vertical gradient block;
for each subblock within each bidirectional-predicted inter coding block, determining a set of BDOF correlation parameters using a most significant bit of the horizontal gradient summation block, a most significant bit of the vertical gradient summation block, and a most significant bit and a least significant bit of the prediction sample difference block;
determining the first refinement parameter and the second refinement parameter using the set of BDOF correlation parameters;
clipping a value of each of the first refinement parameter and the second refinement parameter to be within a defined value range; and
performing prediction of luma sample values in each bidirectional-predicted inter coding block using a prediction sample value for each sample in each subblock within each bidirectional-predicted inter coding block by using the BDOF offset, the first prediction block, and the first horizontal gradient block.

11. The electronic device of claim 9, wherein obtaining the shifted pair of refinement parameters comprises directly right-shifting each of the first refinement parameter and the second refinement parameter by one bit.

12. The electronic device of claim 11, wherein the first refinement parameter is a variable denoted by vx and the second refinement parameter is a variable denoted by $v_y$, and wherein directly right-shifting of each of the first refinement parameter ($v_x$) and the second refinement parameter ($v_y$) by one bit is determined in accordance with:
$v_x = v_x >> 1$; and
$v_y = v_y >> 1$
where >>denotes right-shifting of the variable.

13. The electronic device of claim 9, wherein in determining a BDOF offset without performing any right shifting using the shifted pair of refinement parameters, the at least one memory stores program code that is executed by the at least one processor to perform operations comprising determining the BDOF offset in accordance with:

$$bdofOffset = (v_x * (gradientHL0[x+1][y+1] - gradientHL1[x+1][y+1])) + (v_y * (gradientVL0[x+1][y+1] - gradientVL1[x+1][y+1]))$$

where bdofOffset is the bidirectional optical flow offset BDOF offset, $v_x$ is the shifted first refinement parameter, $v_y$ is the shifted second refinement parameter, gradietHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

14. The electronic device of claim 9, wherein in wherein obtaining the shifted pair of refinement parameters per a subblock of a bidirectional-predicted inter coding block to obtain a shifted pair of refinement parameters, the at least one memory stores further program code that is executed by the at least one processor to perform operations comprising adding an offset to each of the first refinement parameter and the second refinement parameter before right-shifting.

15. The electronic device of claim 14, wherein the first refinement parameter is a variable denoted by vx and the second refinement parameter is a variable denoted by $v_y$, and wherein in adding an offset to each of the first refinement parameter and the second refinement parameter before right-shifting, the at least one memory stores further program code that is executed by the at least one processor to perform operations add the offset in accordance with:

$v_x = (v_x + 1) >> 1$; and
$v_y = (v_y + 1) >> 1$ where >>denotes right-shifting of the variable.

16. The electronic device of claim 14, wherein in the determining a BDOF offset without performing any right shifting using the shifted pair of refinement parameters, the at least one memory stores further program code that is executed by the at least one processor to perform operations comprising determining the BDOF offset in accordance with:

$$bdofOffset = (v_x * (gradientHL0[x+1][y+1] - gradientHL1[x+1][y+1])) + (v_y * (gradientVL0[x+1][y+1] - gradientVL1[x+1][y+1]))$$

where bdofOffset is the bidirectional optical flow offset BDOF offset, $v_x$ is the first refinement parameter having an added offset, $v_y$ is the second refinement parameter having an added offset, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

17. A computer program product comprising a non-transitory storage medium including program code to be executed by at least one processor of an electronic device, whereby execution of the program code causes the electronic device to perform operations comprising:
obtaining a shifted pair of refinement parameters per a subblock of a bidirectional-predicted inter coding block, wherein the shifted pair of refinement parameters comprises a shifted first refinement parameter and a shifted second refinement parameter; and
determining a bi-directional optical flow, BDOF, offset without performing any right shifting using at least the shifted pair of refinement parameters by, for each sample in each subblock within each bidirectional-predicted inter coding block, determining the BDOF offset using the shifted first refinement parameter, the shifted second refinement parameter, a first horizontal gradient block and a first vertical gradient block for a first prediction block, and a second horizontal gradient block and a second vertical gradient block for a second prediction block.

18. The computer program product of claim 17, whereby execution of the program code causes the electronic device to perform further operations comprising:
for each bidirectional-predicted inter coding block, determining a first prediction block using a first motion vector and a second prediction block using a second motion vector;
for each of the prediction blocks, determining a first horizontal gradient block and a first vertical gradient block for the first prediction block and a second horizontal gradient block and a second vertical gradient block for the second prediction block;
determining a prediction sample difference block between the first prediction block and the second prediction block;
determining each of a horizontal gradient summation block and a vertical gradient summation block, wherein the horizontal gradient summation block is determined by summing the first horizontal gradient block and the second horizontal gradient block and the vertical summation gradient block is determined by summing the first vertical gradient block and the second vertical gradient block;
for each subblock within each bidirectional-predicted inter coding block, determining a set of BDOF correlation parameters using a most significant bit of the horizontal gradient summation block, a most significant bit of the vertical gradient summation block, and a most significant bit and a least significant bit of the prediction sample difference block;
determining the first refinement parameter and the second refinement parameter using the set of BDOF correlation parameters;
clipping a value of each of the first refinement parameter and the second refinement parameter to be within a defined value range; and
performing prediction of luma sample values in each bidirectional-predicted inter coding block using a prediction sample value for each sample in each subblock within each bidirectional-predicted inter coding block by using the BDOF offset, the first prediction block, and the first horizontal gradient block.

19. The computer program product of claim 17, wherein obtaining the shifted pair of refinement parameters comprises directly right-shifting each of the first refinement parameter and the second refinement parameter by one bit.

20. The computer program product of claim 19, wherein the first refinement parameter is a variable denoted by $v_x$ and the second refinement parameter is a variable denoted by $v_y$, and wherein directly right-shifting of each of the first refinement parameter ($v_x$) and the second refinement parameter ($v_y$) by one bit is determined in accordance with:

$v_x = v_x >> 1$; and
$v_y = v_y >> 1$ where >>denotes right-shifting of the variable.

21. The computer program product of claim 17, wherein the determining the BDOF offset without performing any right shifting using the shifted pair of refinement parameters is determined in accordance with:

$$\text{bdofOffset}=(v_x*(\text{gradientHL0}[x+1][y+1]-\text{gradientHL1}[x+1][y+1]))+(v_y*(\text{gradientVL0}[x+1][y+1]-\text{gradientVL1}[x+1][y+1]))$$

where bdofOffset is the bidirectional optical flow offset BDOF offset, $v_x$ is the first refinement parameter, $v_y$ is the second refinement parameter, gradietHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

22. The computer program product of claim 17, wherein obtaining the shifted pair of refinement parameters per a subblock of a bidirectional-predicted inter coding block to obtain a shifted pair of refinement parameters comprises adding an offset to each of the first refinement parameter and the second refinement parameter before right-shifting.

23. The computer program product of claim 22, wherein the first refinement parameter is a variable denoted by $v_x$ and the second refinement parameter is a variable denoted by $v_y$, and wherein adding an offset to each of the first refinement parameter and the second refinement parameter before right-shifting is performed in accordance with:

$$v_x=(v_x+1)>>1; \text{ and}$$
$$v_y=(v_y+1)>>1$$

where >> denotes right-shifting of the variable.

24. The computer program product of claim 17, wherein the determining a BDOF offset without performing any right shifting using the shifted pair of refinement parameters comprises:

$$\text{bdofOffset}=(v_x*(\text{gradientHL0}[x+1][y+1]-\text{gradientHL1}[x+1][y+1]))+(v_y*(\text{gradientVL0}[x+1][y+1]-\text{gradientVL1}[x+1][y+1]))$$

where bdofOffset is the bidirectional optical flow offset BDOF offset, $v_x$ is the first refinement parameter having an added offset, $v_y$ is the second refinement parameter having an added offset, gradientHL0[x+1][y+1] is the first horizontal gradient block, gradientHL1[x+1][y+1] is the second horizontal gradient block, gradientVL0[x+1][y+1] is the first vertical gradient block, and gradientVL1[x+1][y+1] is the second vertical gradient block.

* * * * *